US011636385B2

(12) United States Patent
Amrani et al.

(10) Patent No.: US 11,636,385 B2
(45) Date of Patent: Apr. 25, 2023

(54) TRAINING AN OBJECT DETECTOR USING RAW AND UNLABELED VIDEOS AND EXTRACTED SPEECH

(71) Applicant: International Business Machines Corporation, Armonk, NY (US)

(72) Inventors: Elad Amrani, Zikhron Yaakov (IL); Udi Barzelay, Haifa (IL); Rami Ben-Ari, Kiryat Ono (IL); Tal Hakim, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 16/672,545

(22) Filed: Nov. 4, 2019

(65) Prior Publication Data

US 2021/0133623 A1    May 6, 2021

(51) Int. Cl.
| | |
|---|---|
| *G10L 25/57* | (2013.01) |
| *G06V 10/762* | (2022.01) |
| *G06V 10/764* | (2022.01) |
| *G06N 20/00* | (2019.01) |
| *G10L 15/02* | (2006.01) |

(52) U.S. Cl.
CPC .............. *G06N 20/00* (2019.01); *G10L 15/02* (2013.01)

(58) Field of Classification Search
CPC ......... G10L 15/02; G10L 15/16; G10L 25/57; G06K 9/6218; G06K 9/6224; G06K 9/6259; G06K 9/6288; G06V 10/00; G06V 10/40; G06V 10/426; G06V 10/764; G06V 10/762; G06V 10/7753; G06V 20/41
USPC .......... 704/232, 235, 245, 270; 382/224, 225
See application file for complete search history.

(56) References Cited

U.S. PATENT DOCUMENTS

| | | | |
|---|---|---|---|
| 8,396,286 B1 * | 3/2013 | Aradhye | G06K 9/6262 |
| | | | 382/190 |
| 9,665,824 B2 | 5/2017 | Chang et al. | |
| 9,965,704 B2 | 5/2018 | Zhou et al. | |
| 9,971,940 B1 * | 5/2018 | Sbaiz | G06V 10/764 |
| (Continued) | | | |

FOREIGN PATENT DOCUMENTS

| | | | | |
|---|---|---|---|---|
| EP | 2154631 | * | 2/2010 | G06K 9/00 |
| WO | 2018176035 A1 | | 9/2018 | |

OTHER PUBLICATIONS

Amrani et al., "Learning to Detect and Retrieve Objects from Unlabeled Videos", ICCV 2019 Workshop on Multi-modal Video Analysis and Moments in Time Challenge, Oct. 19, 2019, 5 Pages. (Year: 2019).*

Korbar et al., "Cooperative Learning of Audio and Video Models from Self-Supervised Synchronization", NIPS'18: Proceedings of the 32nd International Conference on Neural Information Processing Systems, pp. 7774-7785, Nov. 9, 2018. (Year: 2018).*

(Continued)

*Primary Examiner* — Martin Lerner
(74) *Attorney, Agent, or Firm* — Barry D. Blount (57) ABSTRACT

An example system includes a processor to receive raw and unlabeled videos. The processor is to extract speech from the raw and unlabeled videos. The processor is to extract positive frames and negative frames from the raw and unlabeled videos based on the extracted speech for each object to be detected. The processor is to extract region proposals from the positive frames and negative frames. The processor is to extract features based on the extracted region proposals. The processor is to cluster the region proposals and assign a potential score to each cluster. The processor is to train a binary object detector to detect objects based on positive samples randomly selected based on the potential score.

15 Claims, 8 Drawing Sheets

(56) References Cited

U.S. PATENT DOCUMENTS

| | | | |
|---|---|---|---|
| 10,013,773 B1* | 7/2018 | Ogale | G06V 10/764 |
| 11,282,509 B1* | 3/2022 | Li | G10L 15/1815 |
| 11,354,900 B1* | 6/2022 | Li | G06V 10/764 |
| 2015/0110387 A1 | 4/2015 | Lienhart et al. | |
| 2016/0174902 A1* | 6/2016 | Georgescu | G06K 9/6255 600/408 |
| 2016/0180196 A1* | 6/2016 | Taylor | G06K 9/6215 382/103 |
| 2016/0379371 A1 | 12/2016 | Chen et al. | |
| 2018/0322371 A1 | 11/2018 | Dupont De Dinechin et al. | |
| 2019/0122072 A1* | 4/2019 | Cricrì | G06K 9/6277 |
| 2019/0138795 A1* | 5/2019 | Vaidya | G10L 25/51 |
| 2019/0258671 A1 | 8/2019 | Bou et al. | |
| 2019/0325269 A1* | 10/2019 | Bagherinezhad | G06K 9/6274 |
| 2019/0340567 A1* | 11/2019 | Long | G06K 9/6271 |
| 2020/0151448 A1* | 5/2020 | Lin | G06K 9/6271 |
| 2020/0189572 A1* | 6/2020 | Rowell | G10L 15/22 |
| 2020/0242507 A1* | 7/2020 | Gan | G06V 10/764 |
| 2020/0394458 A1* | 12/2020 | Yu | G06K 9/6256 |
| 2020/0410298 A1* | 12/2020 | Murali | G06V 10/764 |
| 2021/0065338 A1* | 3/2021 | Peri | G06K 9/6267 |
| 2021/0103762 A1* | 4/2021 | El-Alfy | G10L 25/18 |
| 2021/0133602 A1* | 5/2021 | Amrani | G06N 20/00 |
| 2021/0216780 A1* | 7/2021 | Barzelay | G06V 10/774 |

OTHER PUBLICATIONS

Harwath et al., "Learning word-like units from joint audio-visual analysis", Proceedings of the 55th Annual Meeting of the Association for Computational Linguistics, vol. 1, 12 Pages, May 24, 2017. (Year: 2017).*

Amrani et al., "Self-Supervised Object Detection and Retrieval Using Unlabeled Video", 2020 IEEE/CVF Conference on Computer Vision and Pattern Recognition Workshops (CVPRW), Jun. 14-19, 2020, 9 Pages. (Year: 2020).*

List of Patents or Applications Treated as Related for U.S. Appl. No. 16/672,545, filed Nov. 4, 2019, Appendix P.

Amrani, Elad et al., "Toward Self-Supervised Object Detection in Unlabeled Videos," arXiv:1905.11137v1 [cs.CV], May 27, 2019, pp. 10.

Uijlings, J. R. R. et al., "Selective Search for Object Recognition," International Journal of Computer Vision, 2013, pp. 15.

Mozilla DeepSpeech, "A TensorFlow Implementation of Baidu's DeepSpeech Architecture," Printed Oct. 28, 2019. pp. 3 <https://github.com/mozilla/DeepSpeech>.

Jie, Zequn et al., "Deep Self-Taught Learning for Weakly Supervised Object Localization," arXiv: 1704.05188v2 [cs.CV], National University of Singapore, Apr. 30, 2017 pp. 9.

* cited by examiner

TRAINING AN OBJECT DETECTOR USING RAW AND UNLABELED VIDEOS AND EXTRACTED SPEECH

BACKGROUND

The present techniques relate to training object detectors. More specifically, the techniques relate to self-supervised object detector training.

SUMMARY

According to an embodiment described herein, a system can include processor to receive raw and unlabeled videos. The processor can also further extract speech from the raw and unlabeled videos. The processor can also extract positive frames and negative frames from the raw and unlabeled videos based on the extracted speech for each object to be detected. The processor can also extract region proposals from the positive frames and negative frames. The processor can also extract features based on the extracted region proposals. The processor can also cluster the region proposals and assign a potential score to each cluster. The processor can also train a binary object detector to detect objects based on positive samples randomly selected based on the potential score.

According to another embodiment described herein, a computer-implemented method can include receiving, via a processor, raw and unlabeled videos. The method can further include extracting, via the processor, speech from the raw and unlabeled videos. The method can also further include extracting, via the processor, positive frames and negative frames from the raw and unlabeled videos based on the extracted speech for each object to be detected. The method can also include extracting, via the processor, region proposals from the positive frames and negative frames. The method can further include extracting, via the processor, features based on the extracted region proposals. The method can further include clustering, via the processor, the region proposals and assign a potential score to each cluster. The method can further include training, via the processor, a binary object detector to detect objects based on positive samples selected based on potential score.

According to another embodiment described herein, a computer program product for training object detectors can include computer-readable storage medium having program code embodied therewith. The computer readable storage medium is not a transitory signal per se. The program code is executable by a processor to cause the processor to receive raw and unlabeled videos. The program code can also cause the processor to extract speech from the raw and unlabeled videos. The program code can also cause the processor to extract positive frames and negative frames from the raw and unlabeled videos based on the extracted speech for each object to be detected. The program code can also cause the processor to extract region proposals from the positive frames and negative frames. The program code can also cause the processor to extract features based on the extracted region proposals. The program code can also cause the processor to also further cluster the region proposals and assign a potential score to each cluster. The program code can also cause the processor to train a binary object detector to detect objects based on positive samples randomly selected using the potential score.

According to another embodiment described herein, a computer-implemented method can include receiving, via a processor, an image containing an object to be detected. The method can further include detecting, via a binary object detector trained via self-supervised training on raw and unlabeled videos, the object in the image.

According to another embodiment described herein, a computer program product for detecting objects can include a computer-readable storage medium having program code embodied therewith. The computer readable storage medium is not a transitory signal per se. The program code executable by a processor to cause the processor to receive an image containing an object to be detected. The program code can also cause the processor to detect the object in the image via a binary object detector trained via self-supervised training on raw and unlabeled videos.

DETAILED DESCRIPTION

Object detectors may be trained using labeled training data. For example, labeled training data may include images with bounding boxes that include one or more labeled objects to be detected by the object detector. However, annotating training data to include bounding boxes and labels, or even image labels as in weakly supervised object detection, may be resource intensive and time consuming.

According to embodiments of the present disclosure, a system includes a processor to receive raw and unlabeled videos. The processor can extract speech from the raw and unlabeled videos. For example, the speech may be extracted using automatic transcription or speech-to-text. The processor can extract positive frames and negative frames from the raw and unlabeled videos based on the extracted speech for each object to be detected. As used herein, positive frames refer to frames more likely to include the object. Negative frames refer to frames more likely to exclude the object. The processor can extract region proposals from the positive frames and negative frames. The processor can extract features based on the extracted region proposals. The processor can cluster the region proposals and assign a potential score to each cluster. The processor can train an object detector to detect objects based on positive samples randomly selected based on the potential score.

Thus, embodiments of the present disclosure can confront high noise levels to train a object detector to localize the object of interest in video frames, without any manual labeling or annotation or training data involved. As used herein, a noise level refers to the percentage of falsely labeled training data samples. For example, the noise levels may be up to 68% in some cases. In particular, given raw and unlabeled training videos, an audio channel can be used as a "free" source of weak labels, allowing a convolutional network to learn objects and scenes. For example, by seeing and hearing many frames where the word "guitar" is mentioned, the techniques may be used to detect a guitar due to its shared characteristics over different frames. Despite self-supervised learning from the videos themselves being quite hard when performed in the wild, as the audio and the visual contents may often appear completely unrelated, the techniques are nevertheless able to successfully reduce the level of label noise, detecting frames that contain a desired object, and localize the objects in the relevant frames. In addition, by using Dense Subgraph Discovery, the techniques may provide predictions with high Intersection-over-Union (IoU). Moreover, all these advantages may be provided by the techniques in hard scenarios of large variation in object appearance, typical motion blur in video frames, and in the presence of strong label noise. It is to be understood that some embodiments may not have these potential advantages and these potential advantages are not necessarily required of all embodiments.

Figure 1:
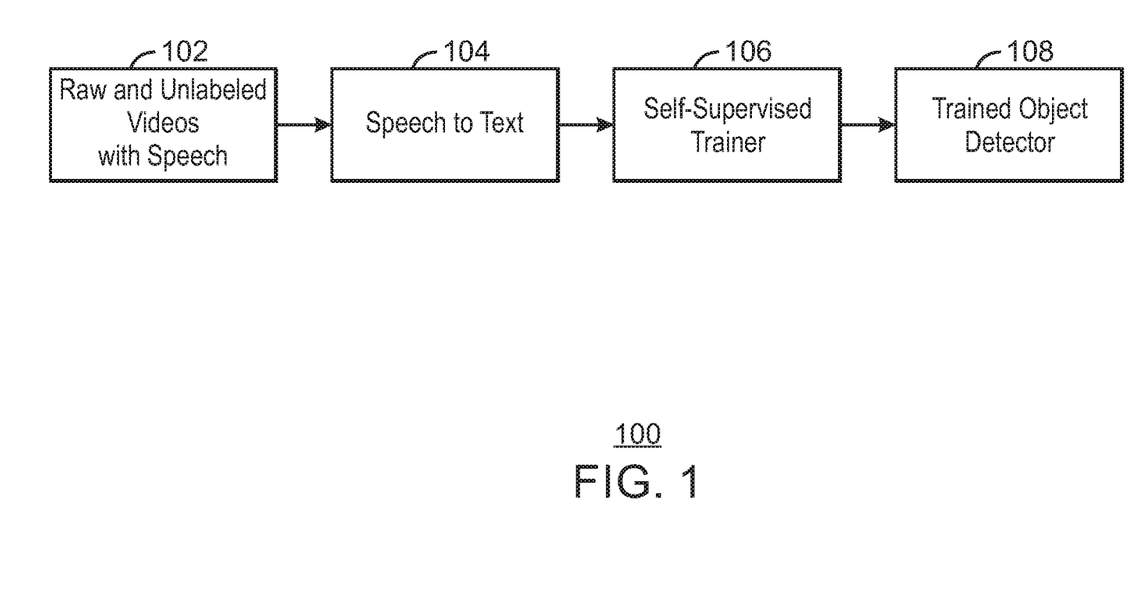
FIG. 1 is a block diagram of an example system for self-supervised training of an object detector.

With reference now to FIG. 1, a block diagram shows an example system for self-supervised training of an object detector. The example system 100 can be implemented using the computing device 500 of FIG. 5 using the method 300 of FIG. 3.

FIG. 1 includes raw and unlabeled videos with speech 102. The system 100 includes a speech-to-text unit 104 to generate text based on extracted speech from the unlabeled videos with speech. The system 100 includes a self-supervised trainer 106 to receive the text and output a trained object detector 108.

In the example of FIG. 1, the self-supervised trainer 106 can train the object detector 108 based on the raw and unlabeled videos with speech 102. In some examples, self-supervision is based on a timed transcript selected automatically, using closed captions or speech-to-text. For example, the raw and unlabeled videos with speech 102 may include closed captions. The self-supervised trainer 106 may extract the closed captions and detect words corresponding to an object to be detected. The corresponding video frames associated with the detected words may be extracted and used as a source of positive frames for training the object detector 108. In another example, the raw and unlabeled videos 102 may include speech that may be converted into text. For example, speech-to-text unit 104 can convert the speech into text using any suitable speech-to-text mechanism. For a given object name, the self-supervised trainer 106 extracts a single frame at the instant the object is mentioned. Yet, the object may only be visible in part of the frames. Sometimes, an object may be mentioned, but out of the frame or missing. Therefore, the object can be detected by searching common themes relating the selected frames and discriminating them from frames in irrelevant videos. In various examples, positive and negative frames are extracted based on a speech transcript. The extracted positive frames may thus be labeled weakly, but with some noise. For example, some of the positive frames may not actually contain the object detected in the text. As one example, the self-supervised trainer 106 can extract candidate frames from time intervals corresponding to the subtitle, containing the object's name synced with the speech mentioning the name of the object. This set of frames is used as a positive set, yet it is noisily labeled as the object might not appear in all of the selected frames.

Still referring to FIG. 1, the self-supervised trainer 106 can also extract negative frames from disparate videos. For example, the disparate videos may be videos that are different from the videos used to extract the positive frames. Creating a negative set that most likely lacks the object of interest allows discriminating between the object and background, essentially solving the object detection problem. The self-supervised trainer 106 can extract feature vectors of region proposals using a pre trained CNN. For example, the pretrained CNN may receive region proposals from both noisy positive and negative samples and generate feature vectors. In some examples, these features are clustered, and a potential score is assigned to each cluster. Based on the potential score, samples may be sampled in a nonuniform way to train the detector. Additionally, in some examples, the clusters are refined iteratively based on the potential score. As one example, the self-supervised trainer may train the object detector 108 using the following algorithm:

---
Algorithm 1: Self-Supervised Object Detection
---
Input: Raw and Unlabeled videos X
Output: Trained object detector D for object O
1    Extract transcript, or create transcript through text to speech model, for all videos in X;
2    Extract positive and negative frames for O;
3    Run Unsupervised Region Proposal method such as Selective Search and extract N region proposals on all selected frames;
4    Compute feature representation for all region proposals;
5    for idx := 0, idx _ MAX_EPOCHS, idx := idx + 1 do:
6      if idx == 0 then
7        Initialize cluster centers using uniform K-Means;
8      else if idx %% I == 0 then
9        Re-initialize cluster centers using Weighted K-Means;
10   Train a weighted DEC;
11   Compute the potential score for each cluster;
12   Run DSD per frame for each cluster;
13   Train a region classifier with sampled positive and negative regions.

Figure 2:
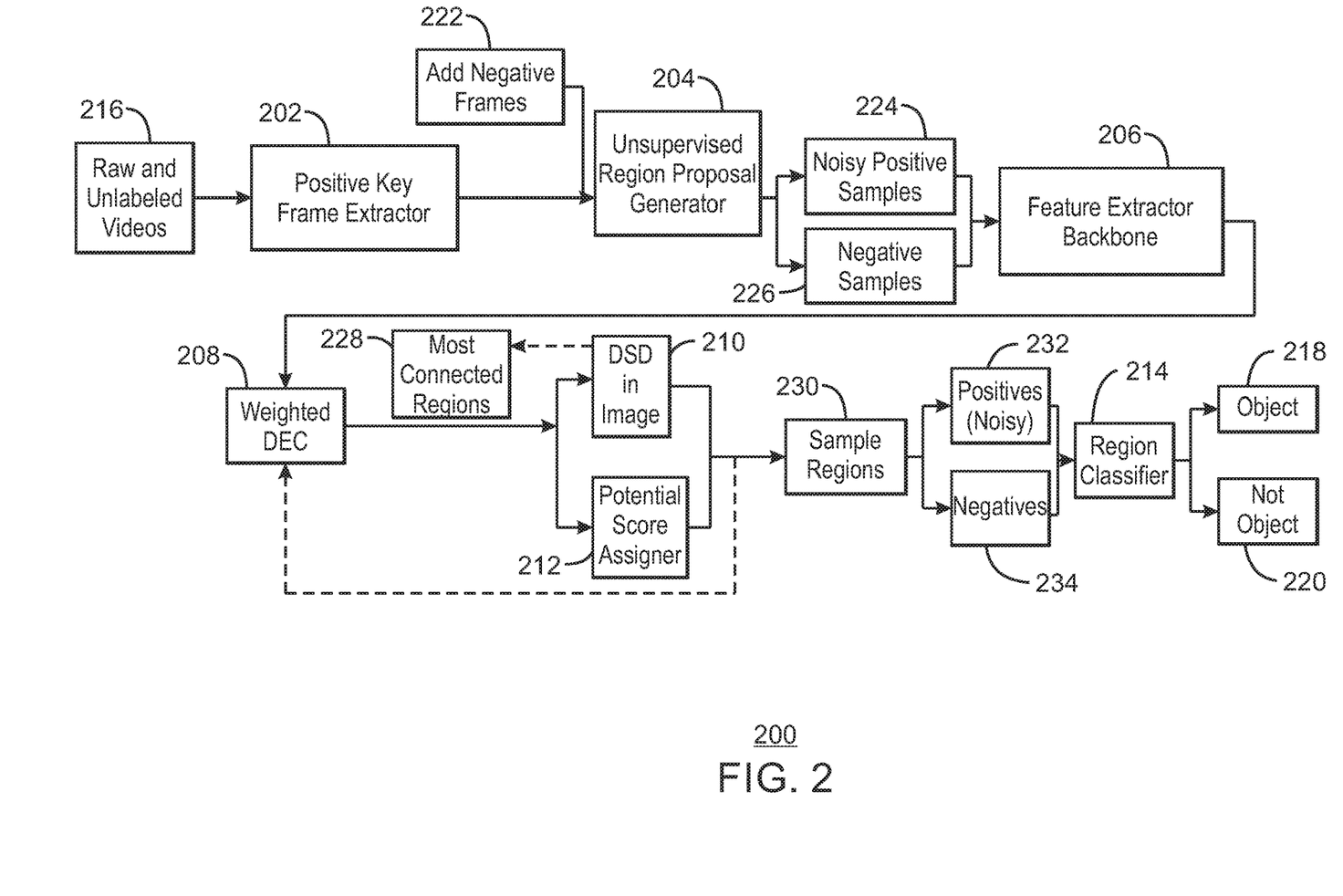
FIG. 2 is a block diagram of another example system for self-supervised training of an object detector.

The elements of the example Algorithm 1 are discussed in greater detail with respect to the system 200 of FIG. 2, which may be used to implement the techniques described herein.

The elements of the example Algorithm 1 are discussed in greater detail with respect to the system 200 of FIG. 2, which may be used to implement the techniques described herein.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional trainers, or additional detectors, etc.).

With reference now to FIG. 2, a block diagram shows another example system for self-supervised training of an object detector. The example system 200 can be implemented using the computing device 500 of FIG. 5 using the method 300 of FIG. 3.

The system 200 of FIG. 2 includes a positive frame extractor 202 communicatively coupled to an unsupervised region proposal generator 204. The system 200 further includes a feature extractor backbone 206 communicatively coupled to the unsupervised region proposal generator 204. For example, the feature extractor backbone 206 may be a pretrained backbone such as Inception-ResNet-v2 CNN or a trained Auto-Encoder. The system 200 also further includes a weighted deep embedded clustering component (DEC) 208 communicatively coupled to the feature extractor backbone 206 and a dense subgraph discovery component (DSD) 210. The system 200 further also includes a potential score assigner 212 communicatively coupled to the weighted DEC 208. The system 200 also include a region classifier 214 communicatively coupled to the DSD 210 and the potential score assigner 212. For example, the region classifier 214 may be a binary object detector.

In the example of FIG. 2, the system 200 may receive raw and unlabeled videos 216 and train the region classifier 214 to output whether a given region is an object 218 or not an object 220. For example, the region classifier 214 may be trained to detect backgrounds and other irrelevant objects as not an object 220.

Still referring to FIG. 2, the input raw and unlabeled videos 216 may be a large set of unlabeled videos. For example, the raw and unlabeled videos 216 may be from a large set of unlabeled videos with speech transcription. As one example, the raw and unlabeled videos 216 may be from an instruction video corpus, such as the YouTube-8M or the How2 corpus, released 2018. As one example, in order to ground a certain category of object, the raw and unlabeled videos 216 may be selected from a large corpus of How2 instructional videos covering a wide variety of topics across 13,000 videos (about 300 hours total duration), with word-level time-aligned subtitles. In various examples, the raw and unlabeled videos 216 may be any video with speech. For example, the speech may be transcribed using any suitable speech to text technique.

The positive frame extractor 202 can extract positive key frames. For example, for a given object name the positive frame extractor 202 can extract a single frame from each center of temporal period where the object was mentioned and use the frame as a key frame. As one example, the object name can be "guitar." This method of extraction may be used for selecting frames that contain the object. Moreover, this selection approach naturally drives frame extraction from relevant videos. For example, the selected images may be used to generate a noisy positive set, labeled as $y_l=1$. In addition, the system 200 can construct a balanced negative set, $y_l=0$, containing added negative frames 222 randomly selected from disparate videos, that the object was not mentioned in. These frames will most likely be without the object of interest, but will include elements contained in the surroundings of the object instances in the positive frames. In the example of a guitar, these elements may include, for example, faces, hands, tables and chairs.

For each positive frame and negative frame, the unsupervised region proposal generator 204 can extract N region proposals. For example, the unsupervised region proposal generator 204 can extract region proposals using Selective Search for object recognition. For example, the region proposals may be bounding boxes in which the unsupervised region proposal generator 204 has detected an object.

In various examples, extracted regions from the unsupervised region proposal generator 204 are labeled as noisy positive samples 224 or negative samples 226. For example, the extracted regions may be labeled according to the corresponding frame label, $y_{li}=y_l$.

The feature extractor backbone 206 maps each candidate region to a feature space. For example, the feature space may be represented by $z_{li}$.

Following feature extraction, the weighted DEC 208 clusters the region proposals using a variation of deep embedded clustering (DEC). Following the DEC, in some examples, the weighted student's t-distribution may be used as a similarity measure. For example, the similarity measure may be calculated using the Equation:

$$q_{i,j} = \frac{(1 + \|z_i - \mu_j\|^2)^{-1} \cdot w(i, j)}{\sum_{j'} (1 + \|z_i - \mu_{j'}\|^2)^{-1} \cdot w(i, j')} \qquad \text{Eq. 1}$$

with indices i and j associated with the sample and cluster respectively, $z_i$ corresponds to region embedding and $\mu_j$ is the cluster centroid. Here and in the following examples, the frame index l is omitted for simplicity. In some examples, the newly added w(i,j) act as selective weights. In various examples, the weights may be set according to the region label $y_i \in \{0,1\}$ as:

$$w(i, j) = \begin{cases} 0.5, & \text{if } yi = 0 \\ 1, & \text{otherwise} \end{cases} \qquad \text{Eq. 2}$$

and use the new measure in Eq. 1 to drive the clustering to the target distribution:

$$p_{i,j} = \frac{q_{ij}^2/f_j}{\sum_{j'} q_{ij'}^2/f_{j'}} \text{ with:} \qquad \text{Eq. 3}$$

$$f_j = \sum_i q_{i,j} \qquad \text{Eq. 4}$$

using a Kullback-Leibler divergence loss. This weighted DEC 208 focuses the clustering toward positive regions. In various examples, the weighting may be applied for clusters with positive ratio above a threshold. In some examples, the DEC is re-initialized by weighted K-means every I epochs, with the new weights set by $S_k$ normalized by the number of positive samples in the cluster, as defined by dense subgraph discovery (DSD). In various examples, the clusters, potential score, and DSD are iteratively refined. In some examples, only cluster centroids are optimized, while embeddings of the backbone CNN that creates the features remain fixed.

The weighted DEC 208 may thus be used to determine a common theme across positive regions that is less likely to exist in negative counterparts. To this end, the weighted DEC 208 clusters the regions in the embedded space as described above. For example, clusters with dense population of positive regions are likely to contain the object of interest. Therefore, a positive ratio score may be associated to such clusters. In various examples, the positive ratio score may be defined as the ratio between the positive and the total number of samples in the cluster. The regions are labeled according to their corresponding frame. Yet, high positive-ratio clusters are noisy, so that real object clusters are not always distinguishable. Therefore, the weighted DEC 208 may search for a target cluster satisfying the following properties: (1) high positive ratio; (2) low cluster variance, for tendency to include a single object type; and (3) cluster members that come from a wide variety of videos, since we expect the object to have a common characteristic among various videos. The last property of having cluster members from a variety of videos may also help offset the high temporal correlation in a single video that may create dense clusters. These constraints may be represented in a softmax function $S_k$, referred to herein as a potential score. The potential score may be the score of cluster k containing the object. For example, the potential score $S_k$ can be calculated using the Equation:

$$S_k = \sigma\left(\tau \frac{P_k^2 \cdot \log U_k}{V_k}\right) k \in \{0 \ldots K-1\} \qquad \text{Eq. 5}$$

where σ(•) is the softmax function, K denoting the total number of clusters, τ∈R is the softmax temperature, $P_k$ is the positive ratio (according to the raw weak labels, since the ground truth labels are not accessible), $V_k$ is the cluster distance variance, and $U_k$ denotes the number of unique videos. In various examples, all parameters are normalized to a unit sum. In various examples, the following may be the order of importance in the potential score components: positive-ratio $P_k$, the cluster variance $V_k$, and lastly the number of unique videos $U_k$. In some examples, the positive-ratio $P_k$ may be squared and the log of $U_k$ may be used.

Still referring to FIG. 2, the DSD component 210 may be used to select most connected regions 228. For example, the most connected regions 228 in positive frames with high quality bounding boxes may be used as positive samples. For example, the DSD component 210 may include a model that defines an undirected unweighted graph for a set of region proposals in a given image. For example, the nodes of the graph may correspond to region proposals and the edges may be formed by connecting each proposal (node) to multiple neighbors that have mutual IoU larger than a pre-defined threshold. As one example, the DSD component 210 may extract the top 10% of the most connected nodes to be labeled as positives 232. The positives 232 may thus be noisy, but with reduced noise. In various examples, the system 200 may also further make use of the remaining regions as hard negative samples. As used herein, hard negative samples refer to examples that are negative but were erroneously received a high score as positive in a model. For example, the remaining regions may include non-object regions and regions containing only parts of the object.

In various examples, each cluster is assigned a potential score as defined in Eq. 5. This potential score is based on a positive ratio, a cluster variance, and cluster member variety, or any combination thereof. The potential score may be formulated to correlate with cluster purity. For example, cluster purity may be measured using the ratio of regions in a cluster that contains true instances of the object. In some examples, the region classifier 214 is then trained by being fed by the following samples: for positive samples, the regions selected by DSD and sample regions with high potential score $S_k$ are used for training. In some examples, the sampling distribution is the normalized score Sk. Because the sample scores are associated with their corresponding cluster k, this sampling strategy allows sampling from several clusters. This sampling regime continuously reduces the noise level in the positive set to train a higher accuracy region classifier 214. Negative samples are sampled uniformly from the negative frames and are combined with the rejected regions from DSD that are used as hard negatives. In various examples, the region classifier 214 is a multilayer perceptron with three fully connected layers trained to separate between object and background, using cross-entropy loss. In every training cycle, the detector is initialized for training with weights from previous iteration.

As one example, the settings for clustering may be set to K=50, and τ=50 in may be used in Eq. 5. The positive ratio threshold may be set as $P_k$≥0.6. In the region classifier 214, three fully connected (FC) layers (1024, 1024, 2) may be used with a ReLU activation in layers 1-2 and a softmax activation for the output layer. A dropout may be used for the two hidden layers with probability of 0.8. In some examples, the region classifier 214 can be trained with the cross-entropy loss function. The ADAM optimizer may be used for optimization with a learning rate of $10^{-4}$. The learning rate is decreased by a factor of 0.6 every 6 epochs. We train our model for 35 epochs for all objects. In various examples, the training may performed using a graphics processing unit. For example, the GPU may be a Tesla K80 GPU, or any other suitable GPU. In some examples, after initial feature extraction, a single epoch duration (DEC, DSD & detector training) may last around 15 mins. As one example, using the Tesla K80 GPU, the training may amount to about 9 hours for an object.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional client devices, or additional resource servers, etc.).

Figure 3:
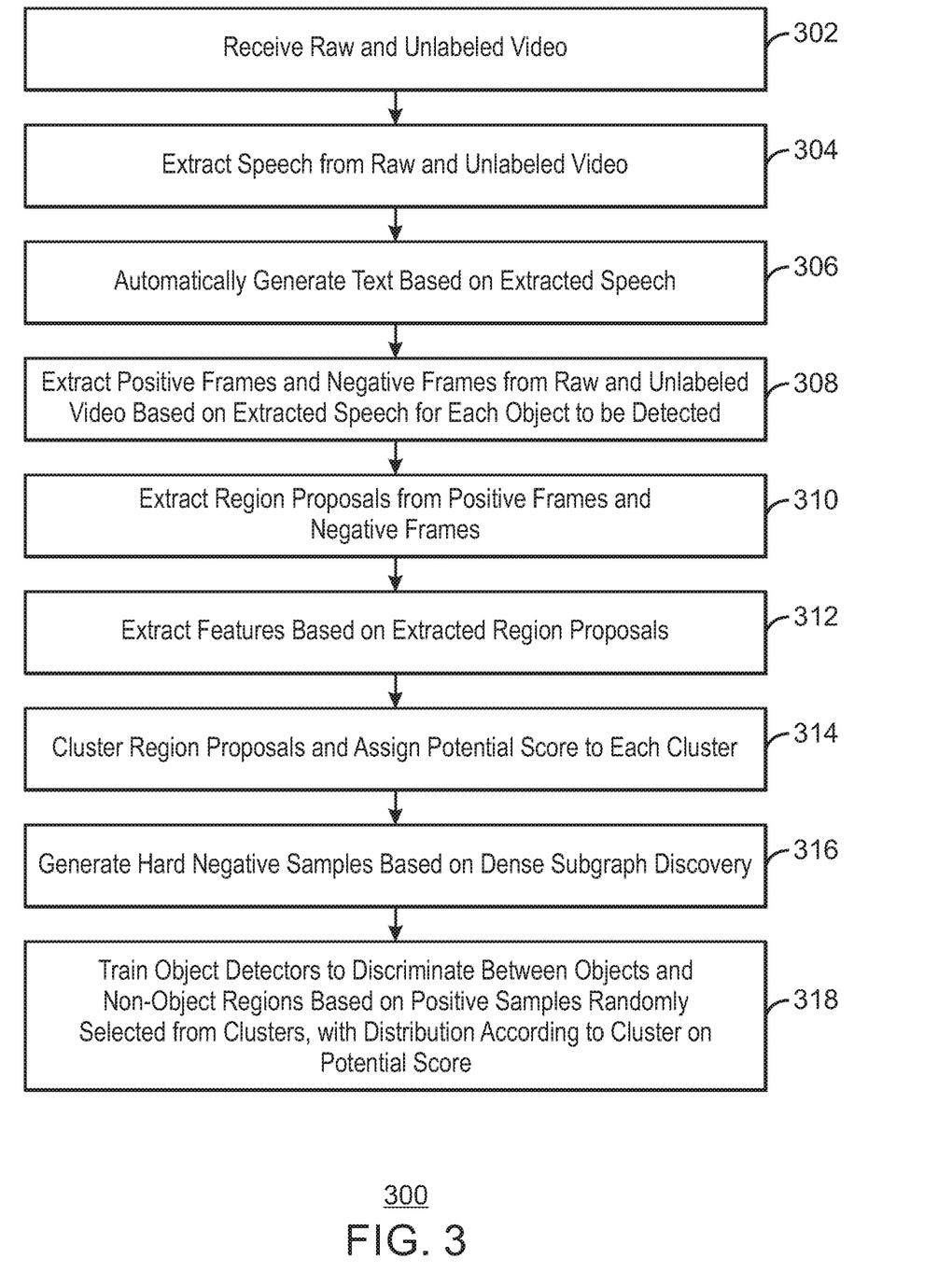
FIG. 3 is a block diagram of an example method that can train an object detector using raw and unlabeled videos.

FIG. 3 is a process flow diagram of an example method that can train an object detector using raw and unlabeled videos. The method 300 can be implemented with any suitable computing device, such as the computing device 500 of FIG. 5 and is described with reference to the systems 100 and 200 of FIGS. 1 and 2. For example, the methods described below can be implemented by the processor 502 or the processor 802 of FIGS. 5 and 8.

At block 302, raw and unlabeled videos are received. For example, the raw and unlabeled videos may be instructional videos with synchronized closed captions. In some examples, the raw and unlabeled videos may have audio used to generate associated text. In various examples, videos with a high correlation between speech and video content may be received. For example, the videos may be instructional videos.

At block 304, speech is extracted from the raw and unlabeled videos. In some examples, text may be generated using any suitable speech to text technique. For example, the text may be generated using any suitable speech to text (STT) model, such as DeepSpeech. In various examples, if the video includes closed captions, then the closed captions may be extracted.

At block 306, text is automatically generated based on the extracted speech. For example, the text may be generated using an automatic transcription or captioning. In some examples, the text may be generated using speech-to-text.

At block 308, positive frames and negative frames are extracted from the raw and unlabeled videos based on the extracted speech for each object to be detected. For example, a single key frame can be extracted from each center of temporal period where the object was mentioned in the extracted speech and labeled a positive frame. The positive frames may thus be noisy labeled because the positive frames may not necessarily include the object. In various examples, a negative set of negative frames may be constructed by randomly selecting frames from disparate videos in which the object was not mentioned.

At block 310, region proposals are extracted from the positive frames and negative frames. For example, the region proposals may be regions including or excluding an object. In some examples, the region proposals may be extracted using a selective search. As one example, 2000 region proposals may be extracted per positive frame and negative frame.

At block 312, features are extracted based on the extracted region proposals. In some examples, a pretrained convolutional neural network extracts the features from the region proposals. For example, the pretrained convolutional neural network may be pretrained on a classification task. The extracted regions proposals may be input into a pretrained convolutional neural network and the extracted features may be received from the pretrained convolutional neural network. In some examples, the features may be extracted as feature vectors containing a number of features.

At block 314, the region proposals are clustered and a potential score is assigned to each cluster. In various examples, the region proposals are clustered by performing a weighted deep embedded clustering. The potential score for each cluster may be based on a positive ratio, cluster variance, and cluster member variety. For example, clusters with a higher positive ratio may have a higher potential score. Similarly, clusters having a lower cluster variance may have a higher potential score. In addition, clusters with cluster members from a variety of videos may have a higher potential score. As one example, the potential score may be calculated using Eq. 5.

At block 316, hard negative samples are generated based on dense subgraph discovery. For example, the hard negative samples may include regions that do not include an object or include only a part of an object.

At block 318, object detectors are trained to discriminate between objects and non-object regions based on positive samples randomly selected from clusters, with distribution according to cluster potential score. For example, a separate binary object detector may be trained for each object to be detected in an image. In various examples, the selected positive samples may be from clusters with higher potential scores. In some examples, the selected positive samples may be regions selected using DSD.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may also include generating hard negative samples using dense subgraph discovery and uniformly sampling the negative frames. The binary object detector may be trained to detect non-object regions based on the combined hard negative samples and sampled negative frames. Furthermore, the method 300 may include iteratively refining the clusters based on the potential score of the clusters.

Figure 4:
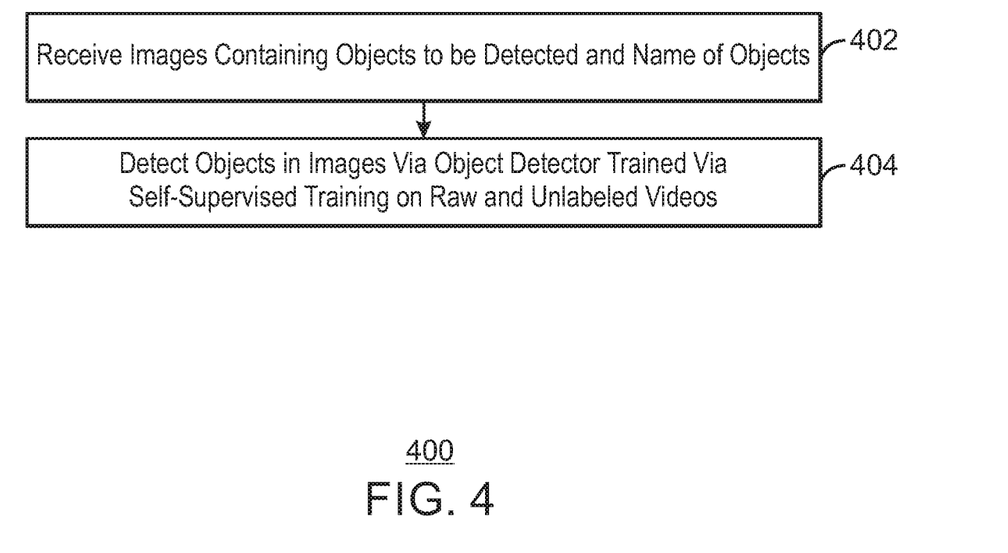
FIG. 4 is a block diagram of an example method that can detect objects using an object training trained via self-supervised training on raw and unlabeled videos.

FIG. 4 is a process flow diagram of an example method that can detect objects using an object training trained via self-supervised training on raw and unlabeled videos. The method 400 can be implemented with any suitable computing device, such as the computing device 500 of FIG. 5 and is described with reference to the systems 100 and 200 of FIGS. 1 and 2. For example, the methods described below can be implemented by the processor 502 or the processor 802 of FIGS. 5 and 8.

At block 402, images containing objects to be detected and names of the objects are received. For example, the images may be frames from a video or still images.

At block 404, objects in the images are detected via an object detector trained via self-supervised training on raw and unlabeled videos. The object detector may be trained to detect an object based on detected instances of the object in the audio of the raw and unlabeled videos. For example, the object detector may trained using the method 300 of FIG. 3. In some examples, the image may then be displayed with a bounding box enclosing the detected object.

The process flow diagram of FIG. 4 is not intended to indicate that the operations of the method 400 are to be executed in any particular order, or that all of the operations of the method 400 are to be included in every case. Additionally, the method 400 can include any suitable number of additional operations. For example, the method 400 may include detecting a non-object region in the image. In some examples, the binary object detector is trained to detect the non-object region based on a combination of hard negative samples and sampled negative frames. For example, the binary object detector may be trained to detect background regions using samples from raw and unlabeled videos without any instances of the object in the audio.

In some scenarios, the techniques described herein may be implemented in a cloud computing environment. As discussed in more detail below in reference to at least FIGS. 5-8, a computing device configured to train an object detector using raw and unlabeled videos may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
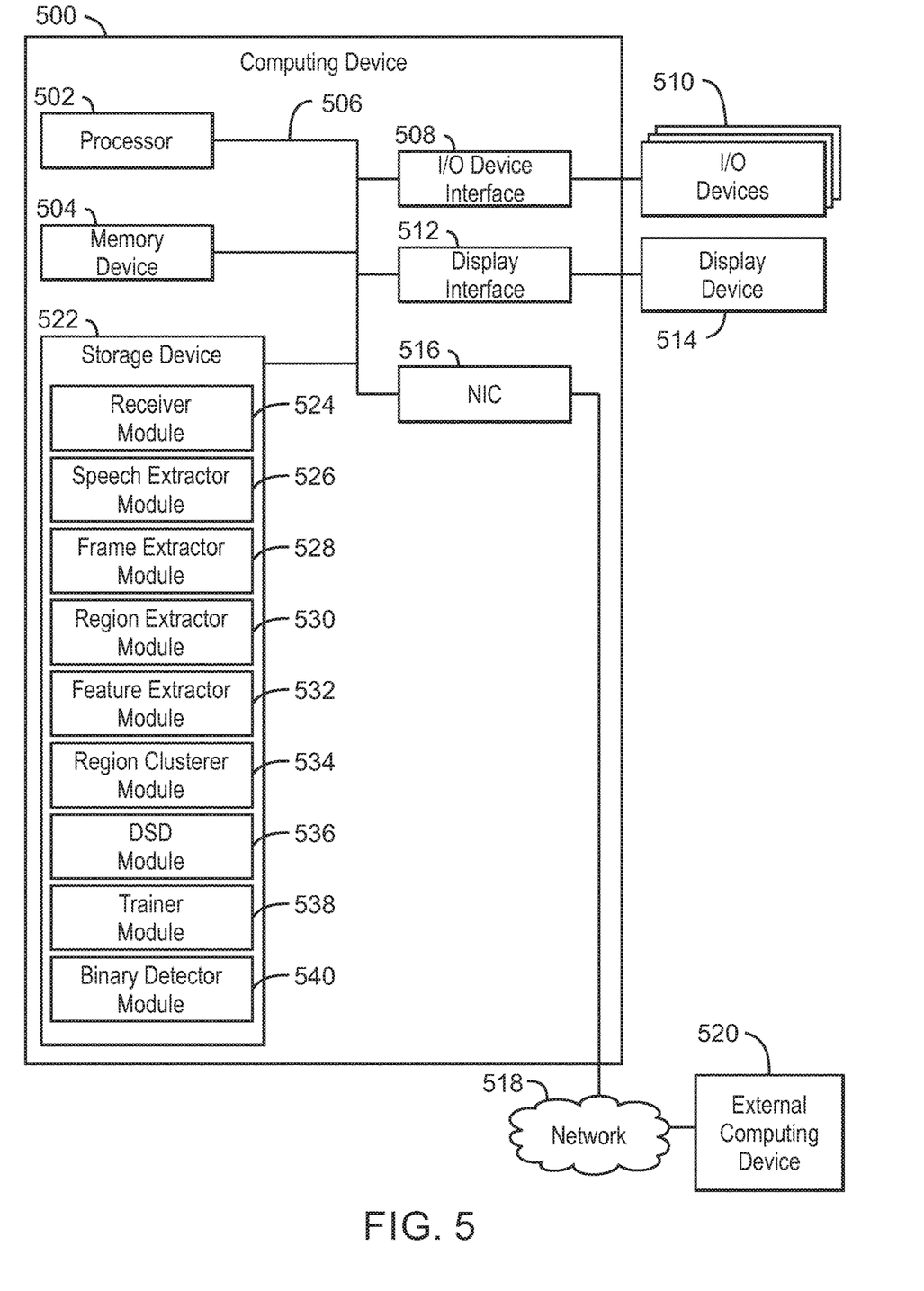
FIG. 5 is a block diagram of an example computing device that can perform self-supervised training of an object detector on raw and unlabeled videos.

FIG. 5 is block diagram of an example computing device that can perform self-supervised training of an object detector on raw and unlabeled video. The computing device 500 may be for example, a server, desktop computer, laptop computer, tablet computer, or smartphone. In some examples, computing device 500 may be a cloud computing node. Computing device 500 may be described in the general context of computer system executable instructions, such as program modules, being executed by a computer system. Generally, program modules may include routines, programs, objects, components, logic, data structures, and so on that perform particular tasks or implement particular abstract data types. Computing device 500 may be practiced in distributed cloud computing environments where tasks are performed by remote processing devices that are linked through a communications network. In a distributed cloud computing environment, program modules may be located in both local and remote computer system storage media including memory storage devices.

The computing device 500 may include a processor 502 that is to execute stored instructions, a memory device 504 to provide temporary memory space for operations of said instructions during operation. The processor can be a single-core processor, multi-core processor, computing cluster, or any number of other configurations. The memory 504 can include random access memory (RAM), read only memory, flash memory, or any other suitable memory systems.

The processor 502 may be connected through a system interconnect 506 (e.g., PCI®, PCI-Express®, etc.) to an input/output (I/O) device interface 508 adapted to connect the computing device 500 to one or more I/O devices 510. The I/O devices 510 may include, for example, a keyboard and a pointing device, wherein the pointing device may include a touchpad or a touchscreen, among others. The I/O devices 510 may be built-in components of the computing device 500, or may be devices that are externally connected to the computing device 500.

The processor 502 may also be linked through the system interconnect 506 to a display interface 512 adapted to connect the computing device 500 to a display device 514. The display device 514 may include a display screen that is a built-in component of the computing device 500. The display device 514 may also include a computer monitor, television, or projector, among others, that is externally connected to the computing device 500. In addition, a network interface controller (NIC) 516 may be adapted to connect the computing device 500 through the system interconnect 506 to the network 518. In some embodiments, the NIC 516 can transmit data using any suitable interface or protocol, such as the internet small computer system interface, among others. The network 518 may be a cellular network, a radio network, a wide area network (WAN), a local area network (LAN), or the Internet, among others. An external computing device 520 may connect to the computing device 500 through the network 518. In some examples, external computing device 520 may be an external web-server 520. In some examples, external computing device 520 may be a cloud computing node.

The processor 502 may also be linked through the system interconnect 506 to a storage device 522 that can include a hard drive, an optical drive, a USB flash drive, an array of drives, or any combinations thereof. In some examples, the storage device may include a receiver module 524, a speech extractor module 526, a frame extractor module 528, a region extractor module 530, a feature extractor module 532, a region clusterer module 534, a dense subgraph discovery (DSD) module 536, a trainer module 538, and a binary detector module 540. The receiver module 524 can receive raw and unlabeled videos. For example, the raw and unlabeled videos may be an instructional video with synchronized closed captions. The speech extractor module 526 can extract speech from the raw and unlabeled videos. In some examples, speech extractor module 526 can generate the text using any suitable speech to text technique. In various examples, if the video includes closed captions, then the speech extractor module 526 can extract the closed captions from the raw and unlabeled videos. In various examples, the speech extractor module 526 can then extract nouns from sentences in the extracted speech. The frame extractor module 528 can extract positive frames and negative frames from the raw and unlabeled videos based on the extracted speech for each object to be detected. For example, the frame extractor module 528 can extract a single key frame from each center of temporal period where the object was mentioned in the extracted speech. For example, each of the extracted nouns may be associated with a segment of the video and a single key frame from the segment may be extracted for each associated noun corresponding to an object to be detected. In various examples, the frame extractor module 528 can construct a negative set of negative frames by randomly selecting frames from disparate videos in which the object was not mentioned. The region extractor module 530 can extract region proposals from the positive frames and negative frames. For example, the region proposals may be regions including or excluding the object. In some examples, the region extractor module 530 can extract the region proposals includes using a selective search. The feature extractor module 532 can extract features based on the extracted region proposals. For example, the feature extractor module 532 may include a pretrained convolutional neural network to extract the features from the region proposals. The region clusterer module 534 can cluster the region proposals and assign a potential score to each cluster. For example, the potential score may be based on a positive ratio, a cluster variance, cluster member variety, or any combination thereof. In various examples, the region clusterer module 534 can cluster the region proposals by performing a weighted deep embedded clustering. In some examples, the DSD module 536 can also generate hard negative samples. The trainer module 538 can train a binary object detector to detect an object based on positive samples randomly selected based on the potential score. In various examples, the trainer module 538 can train a separate binary object detector for each object to be detected in an image. The binary detector module 540 can receive an image containing an object to be detected and detect the object in the image. For example, the binary detector module 540 may be trained via self-supervised training on raw and unlabeled videos. In some examples, the binary detector module 540 can detect a non-object region in the image. For example, the non-object region may be a background.

It is to be understood that the block diagram of FIG. 5 is not intended to indicate that the computing device 500 is to include all of the components shown in FIG. 5. Rather, the computing device 500 can include fewer or additional components not illustrated in FIG. 5 (e.g., additional memory components, embedded controllers, modules, additional network interfaces, etc.). For example, the computing device 500 may include a displayer to display the image with a bounding box enclosing the detected object. Furthermore, any of the functionalities of the receiver 524, the speech extractor module 526, the frame extractor module 528, the region extractor module 530, the feature extractor module 532, the region clusterer module 534, the DSD module 536, the trainer module 538, and the binary detector module 540, may be partially, or entirely, implemented in hardware and/or in the processor 502. For example, the functionality may be implemented with an application specific integrated circuit, logic implemented in an embedded controller, or in logic implemented in the processor 502, among others. In some embodiments, the functionalities of the receiver 524, the speech extractor module 526, the frame extractor module 528, the region extractor module 530, the feature extractor module 532, the region clusterer module 534, the DSD module 536, the trainer module 538, and the binary detector module 540 can be implemented with logic, wherein the logic, as referred to herein, can include any suitable hardware (e.g., a processor, among others), software (e.g., an application, among others), firmware, or any suitable combination of hardware, software, and firmware.

Figure 6:
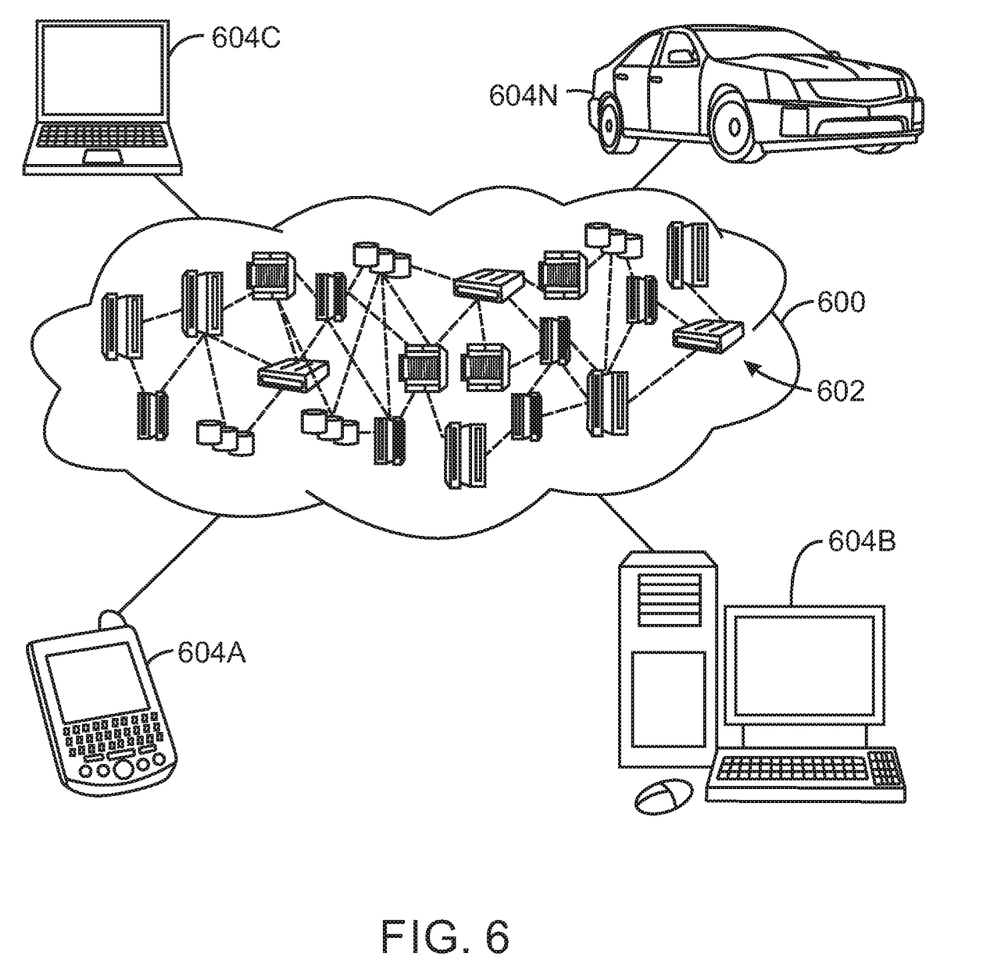
FIG. 6 is a diagram of an example cloud computing environment according to embodiments described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
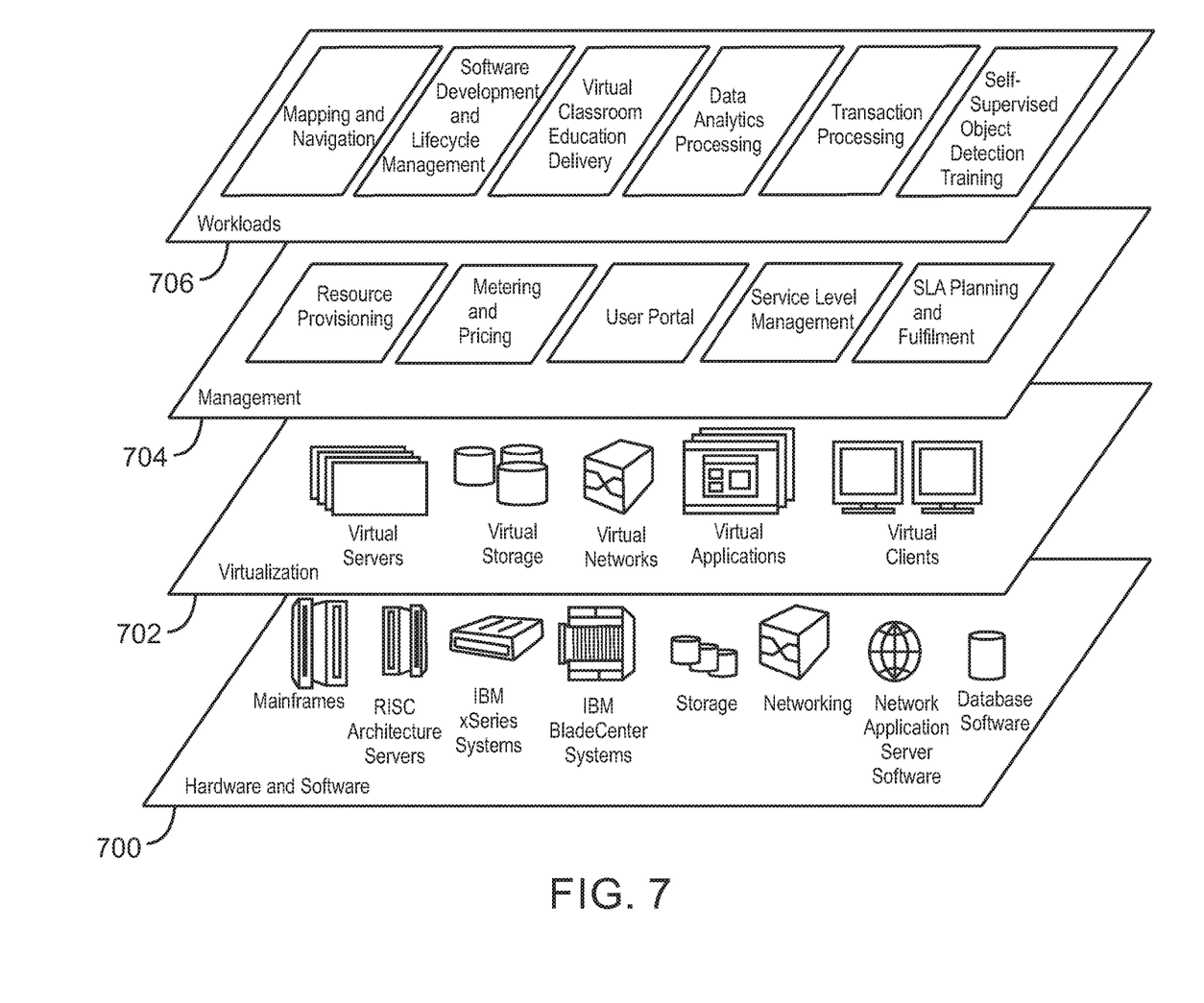
FIG. 7 is a diagram of an example abstraction model layers according to embodiments described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and self-supervised object detection training.

The present invention may be a system, a method and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 8:
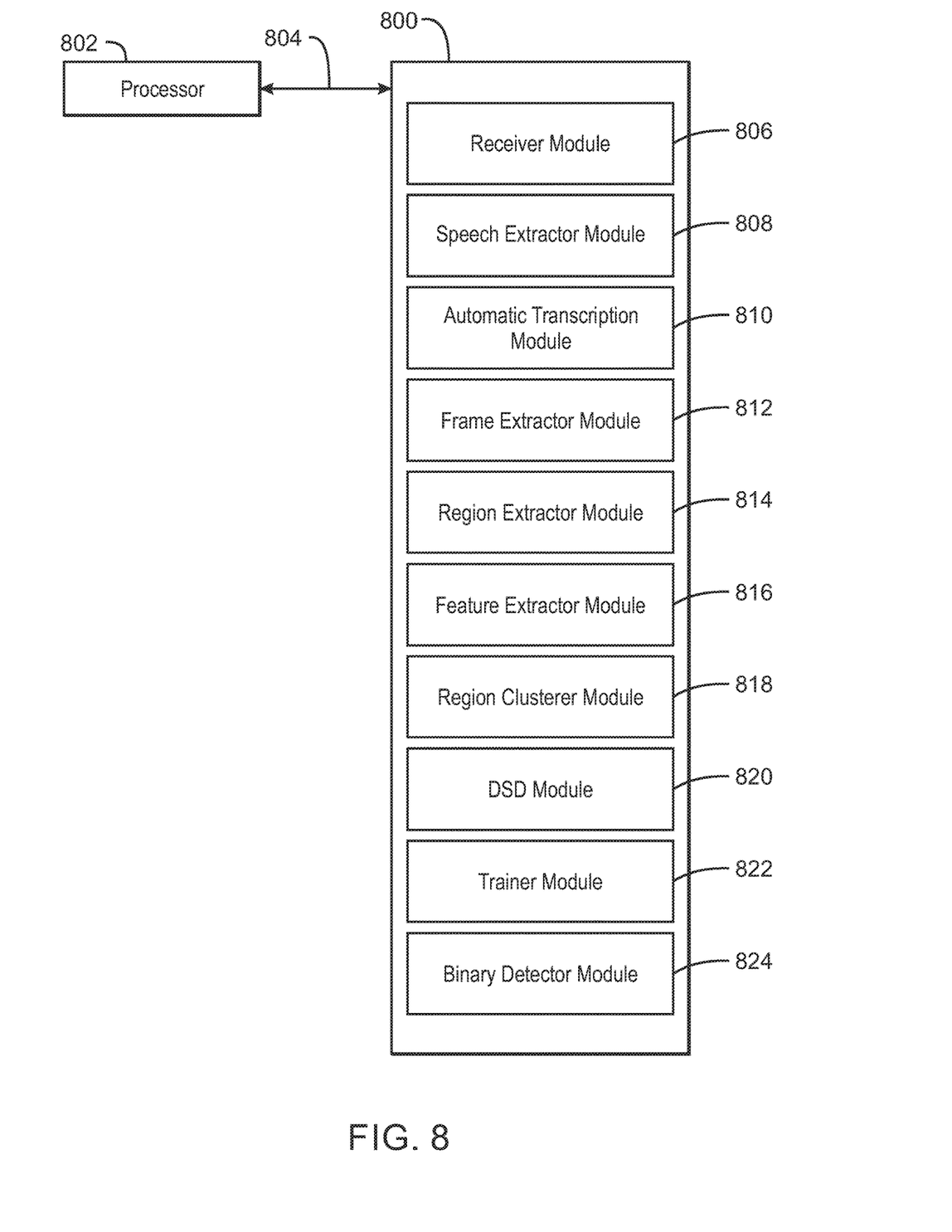
FIG. 8 is an example tangible, non-transitory computer-readable medium that can perform self-supervised training of an object detector on raw and unlabeled videos.

Referring now to FIG. 8, a block diagram is depicted of an example tangible, non-transitory computer-readable medium 800 that can perform self-supervised training of an object detector on raw and unlabeled videos. The tangible, non-transitory, computer-readable medium 800 may be accessed by a processor 802 over a computer interconnect 804. Furthermore, the tangible, non-transitory, computer-readable medium 800 may include code to direct the processor 802 to perform the operations of the methods 300 and 400 of FIGS. 3 and 4.

The various software components discussed herein may be stored on the tangible, non-transitory, computer-readable medium 800, as indicated in FIG. 8. For example, a receiver module 806 includes code to receive raw and unlabeled videos. For example, the raw and unlabeled videos may be an instructional video with synchronized closed captions. A speech extractor module 808 includes code to extract speech from the raw and unlabeled videos. The speech extractor module 808 further includes code to generate the text using speech to text. The speech extractor module 808 also includes code to extract the closed captions from the raw and unlabeled videos. An automatic transcription module 810 includes code to automatically generate text based on the extracted speech. For example, the automatic transcription module 810 includes code to generate the text using speech-to-text. A frame extractor module 812 includes code to extract positive frames and negative frames from the raw and unlabeled videos based on the extracted speech for each object to be detected. For example, the frame extractor module 812 may include code to extract a single key frame from each center of temporal period where the object was mentioned in the extracted speech. In various examples, the frame extractor module 812 includes code to construct a negative set of negative frames by randomly selecting frames from disparate videos in which the object was not mentioned. A region extractor module 814 includes code to extract region proposals from the positive frames and negative frames. For example, the region proposals may be regions including or excluding the object. In some examples, the region extractor module 814 includes code to extract the region proposals includes using a selective search. A feature extractor module 816 includes code to extract features based on the extracted region proposals. For example, the feature extractor module 816 includes code to send the extracted region proposals to a pretrained convolutional neural network to extract the features from the region proposals and receive the extracted features from the pretrained convolutional neural network. A region clusterer module 818 includes code to cluster the region proposals and assign a potential score to each cluster. For example, the potential score may be based on a positive ratio, a cluster variance, and cluster member variety. In various examples, the region clusterer module 818 may include code to cluster the region proposals by performing a weighted deep embedded clustering. A dense subgraph discovery (DSD) module 820 includes code to label a predetermined percentage of extracted region proposals as positive samples based on connectedness to other region proposals. In some examples, the DSD module 820 also includes code to generate hard negative samples. A trainer module 822 includes code to train a binary object detector to detect objects based on positive samples randomly selected based on the potential score. In various examples, the trainer module 822 includes code to train a separate binary object detector for each object to be detected in an image. In some examples, the trainer module 822 includes code to detect a number of times that the object is shown in a raw and unlabeled video. For example, the trainer module 822 may include code to detect how many time that object was shown in the video and therefore measure an object exposure in the video. In various examples, measuring the object exposure can be done in a self-supervised way without any labeling. In some examples, the trainer module 822 can include code to detect a number of times the object appeared when mentioned in one of the raw and unlabeled videos. A binary detector module 824 includes code to receive an image containing an object to be detected and detect the object in the image. For example, the binary detector module 824 may be trained via self-supervised training on raw and unlabeled videos. It is to be understood that any number of additional software components not shown in FIG. 8 may be included within the tangible, non-transitory, computer-readable medium 800, depending on the particular application.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 8 may be included within the tangible, non-transitory, computer-readable medium 800, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive raw and unlabeled videos;
   extract speech from the raw and unlabeled videos;
   extract positive frames and negative frames from the raw and unlabeled videos based on the extracted speech for each object to be detected;
   extract region proposals from the positive frames and negative frames;
   extract features based on the extracted region proposals;
   cluster the region proposals and assign a potential score to each cluster; and
   train a binary object detector to detect objects based on positive samples randomly selected based on the potential score.

2. The system of claim 1, wherein the potential score is based on a positive ratio.

3. The system of claim 1, wherein the potential score is based on a cluster variance.

4. The system of claim 1, wherein the potential score is based on cluster member variety.

5. The system of claim 1, wherein the potential score is based on a positive ratio, a cluster variance, and cluster member variety.

6. A computer-implemented method, comprising:
   receiving, via a processor, raw and unlabeled videos;
   extracting, via the processor, speech from the raw and unlabeled videos;
   extracting, via the processor, positive frames and negative frames from the raw and unlabeled videos based on the extracted speech for each object to be detected;
   extracting, via the processor, region proposals from the positive frames and negative frames;

extracting, via the processor, features based on the extracted region proposals;

clustering, via the processor, the region proposals and assign a potential score to each cluster; and training, via the processor, a binary object detector to detect objects based on positive samples selected based on potential score.

7. The computer-implemented method of claim 6, comprising generating, via the processor, hard negative samples using dense subgraph discovery and uniformly sampling the negative frames, the processor to train the binary object detector to detect non-object regions based on the combined hard negative samples and sampled negative frames.

8. The computer-implemented method of claim 6, wherein extracting the region proposals comprises using a selective search.

9. The computer-implemented method of claim 6, wherein clustering the region proposals comprises performing a weighted deep embedded clustering.

10. The computer-implemented method of claim 6, comprising iteratively refining the clusters based on the potential score of the clusters.

11. A computer program product for training object detectors, the computer program product comprising a computer-readable storage medium having program code embodied therewith, the program code executable by a processor to cause the processor to:

receive raw and unlabeled videos;

extract speech from the raw and unlabeled videos;

extract positive frames and negative frames from the raw and unlabeled videos based on the extracted speech for each object to be detected;

extract region proposals from the positive frames and negative frames;

extract features based on the extracted region proposals;

cluster the region proposals and assign a potential score to each cluster; and train a binary object detector to detect objects based on positive samples randomly selected using the potential score.

12. The computer program product of claim 11, further comprising program code executable by the processor to generate hard negative samples using dense subgraph discovery and uniformly sample the negative frames and train the binary object detector to detect non-object regions based on the combined hard negative samples and sampled negative frames.

13. The computer program product of claim 11, further comprising program code executable by the processor to extract the region proposals comprises using a selective search.

14. The computer program product of claim 11, further comprising program code executable by the processor to detect a number of times that the object is shown in a raw and unlabeled video comprising the image.

15. The computer program product of claim 11, further comprising program code executable by the processor to detect a number of times the object appeared when mentioned in one of the raw and unlabeled videos.

* * * * *